United States Patent
Kim et al.

(10) Patent No.: US 10,528,164 B2
(45) Date of Patent: Jan. 7, 2020

(54) DISPLAY DEVICE, BACKLIGHT UNIT, GUIDE PANEL, AND FLEXIBLE PRINTED CIRCUIT

(71) Applicant: LG DISPLAY CO., LTD., Seoul (KR)

(72) Inventors: TaeWoo Kim, Paju-si (KR); JuHan Kim, Bucheon-si (KR); Kyungjae Park, Incheon (KR)

(73) Assignee: LG DISPLAY CO., LTD., Seoul (KR)

( * ) Notice: Subject to any disclaimer, the term of this patent is extended or adjusted under 35 U.S.C. 154(b) by 100 days.

(21) Appl. No.: 15/441,723

(22) Filed: Feb. 24, 2017

(65) Prior Publication Data

US 2017/0249040 A1 Aug. 31, 2017

(30) Foreign Application Priority Data

Feb. 25, 2016 (KR) .................. 10-2016-0022365

(51) Int. Cl.
*G06F 3/041* (2006.01)
*G06F 3/044* (2006.01)
*F21V 8/00* (2006.01)

(52) U.S. Cl.
CPC .......... *G06F 3/0412* (2013.01); *G02B 6/0055* (2013.01); *G02B 6/0088* (2013.01); *G06F 3/044* (2013.01); *G06F 3/0414* (2013.01); *G06F 3/0416* (2013.01); *G06F 2203/04102* (2013.01)

(58) Field of Classification Search
CPC .... G06F 3/0412; G06F 3/0414; G06F 3/0416; G06F 3/044; G06F 2203/04102; G02B 6/0055; G02B 6/0088
See application file for complete search history.

(56) References Cited

U.S. PATENT DOCUMENTS

| 2009/0237374 | A1* | 9/2009 | Li | G06F 3/0414 345/174 |
| 2011/0095999 | A1* | 4/2011 | Hayton | G06F 1/1626 345/173 |
| 2013/0265256 | A1* | 10/2013 | Nathan | G06F 3/0414 345/173 |
| 2014/0239322 | A1 | 8/2014 | Lee et al. | |
| 2014/0247402 | A1* | 9/2014 | Chou | G02F 1/13338 349/12 |

(Continued)

FOREIGN PATENT DOCUMENTS

| CN | 103383500 A | 11/2013 |
| CN | 103969867 A | 8/2014 |
| CN | 104880859 A | 9/2015 |

*Primary Examiner* — Kent W Chang
*Assistant Examiner* — Sujit Shah
(74) *Attorney, Agent, or Firm* — Birch, Stewart, Kolasch & Birch, LLP

(57) ABSTRACT

A display device, a backlight unit, a guide panel, and a flexible printed circuit, are disclosed which include a conductive pattern on a part of an outer surface of a guide panel or a folding portion formed by folding a side end portion of the flexible printed circuit. The conductive pattern or the folding portion is electrically connected to an electrode located below the display device. A simple structure is provided in which a signal output from a signal input medium positioned above the guide panel is easily transmitted to an electrode located below the display device through the conductive pattern of the guide panel or the folding portion of the flexible printed circuit.

22 Claims, 24 Drawing Sheets

(56) References Cited

U.S. PATENT DOCUMENTS

| | | | |
|---|---|---|---|
| 2014/0321244 A1* | 10/2014 | Lee | A61B 8/4444 367/180 |
| 2015/0177548 A1* | 6/2015 | Jeon | G02F 1/133308 349/12 |
| 2015/0199038 A1* | 7/2015 | Li | G06F 3/041 345/173 |
| 2015/0370396 A1* | 12/2015 | Hotelling | G06F 3/0414 345/174 |

* cited by examiner

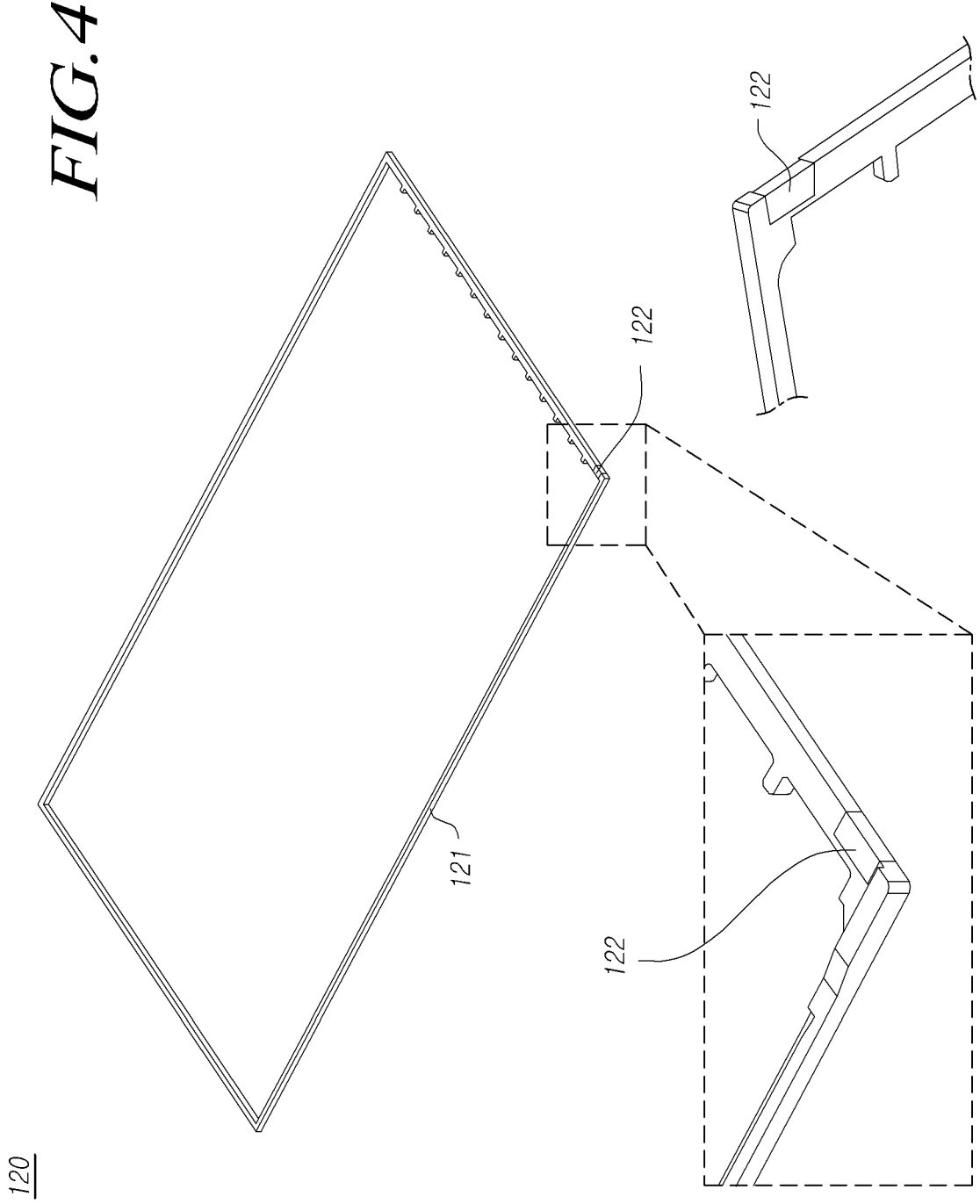

DISPLAY DEVICE, BACKLIGHT UNIT, GUIDE PANEL, AND FLEXIBLE PRINTED CIRCUIT

CROSS REFERENCE TO RELATED APPLICATION

This application claims priority from Korean Patent Application No. 10-2016-0022365, filed on Feb. 25, 2016, which is hereby incorporated by reference for all purposes as if fully set forth herein.

BACKGROUND OF THE INVENTION

1. Field of the Invention

Embodiments of the present invention disclosed herein relate to a display device, and a backlight unit, a guide panel, and a flexible printed circuit, which are included in the display device.

2. Description of the Prior Art

According to the development of the information society, demand for a display device for displaying an image has increased in various types. Various types of display devices, such as a liquid crystal display device, a plasma display device, and an organic light emitting display device, have been utilized.

A display device provides functions of recognizing a user's touch on a display panel and causing the display device to be operated based on the recognized touch in order to improve the user's convenience and provide various functions.

A display device, which is capable of performing a touch input processing in this manner, is being developed so as to provide more various functions, and the users' demands for the touch input processing function are being further diversified.

However, the conventional touch input processing method is a method of sensing a user's touch position on a display panel and performing a related input processing based on the sensed touch position. However, there are limitations in providing various functions and satisfying the users' demands through the touch input processing.

Accordingly, there is a demand for a display device that is capable of processing a user's touch input on a display panel in various ways, and improvements in the configuration or structure of the display device are required for various touch input processes.

Further, when the configuration or structure is improved for a touch input processing function to be added to the conventional display device, it is very important to improve the display device such that various touch input processing functions can be provided without affecting the structure of the conventional display device or the functions provided by the conventional display device.

SUMMARY OF THE INVENTION

Embodiments of the present invention provide a display device that senses a touch force applied by a user to a display panel when the user touches the display panel and operates according to the sensed touch force.

Embodiments of the present invention compactly configure a structure of a display device, which operates by sensing a touch force applied by a user to a display panel.

Embodiments of the present invention provide a guide panel and a flexible printed circuit having a structure that allows a structure of a display device capable of touch force recognition to be compactly configured.

An embodiment of the present invention provides a display device including: a display panel including a plurality of first electrodes embedded therein; a second electrode disposed to be spaced apart from a rear surface of the display panel; and a guide panel located below the display panel and disposed along a peripheral edge of the display panel. The guide panel includes a first conductive pattern that is electrically connected to the second electrode.

In addition, when the display device further includes a ground electrode below the second electrode, the guide panel may further include a second conductive pattern electrically connected to the ground electrode.

In addition, the first conductive pattern or the second conductive pattern may be formed to be positioned only on an outer surface of the guide panel, to wrap a top surface and the outer surface of the guide panel, to wrap the outer surface and a bottom surface of the guide panel, or to wrap the top surface, the outer surface, and the bottom surface of the guide panel.

Another embodiment of the present invention provides a display device including: a display panel including a plurality of first electrodes embedded therein; a guide panel located below the display panel and disposed along a peripheral edge of the display panel; a second electrode disposed to be spaced apart from a rear surface of the display panel; a first flexible printed circuit electrically connected to the display panel; and a second flexible printed circuit electrically connected to the first flexible printed circuit. The second flexible printed circuit includes a first folding portion folded to a side surface of the guide panel and having an end portion electrically connected to the second electrode.

In addition, when the display device further includes a ground electrode below the second electrode, the second flexible printed circuit may further include a second folding portion folded to a side face of the guide panel and having an end electrically connected to the ground electrode.

According to the embodiments of the present invention, it is possible to provide a display device having a structure capable of sensing a touch force as well as a touch position when a user touch is generated on the display panel.

According to the embodiments of the present invention, it is possible to provide a display device in which a path of an electrode driving signal for touch force sensing of a user's touch is compactly implemented by improving the structures of the guide panel, the flexible printed circuit, and the like included in the conventional display device.

BRIEF DESCRIPTION OF THE DRAWINGS

The above and other objects, features, and advantages of the present invention will be more apparent from the following detailed description taken in conjunction with the accompanying drawings, in which:

FIGS. 4 to 6 are drawings each illustrating exemplary structures of a display panel and a flexible printed circuit that are included in a display device according to a first embodiment of the present invention, which is capable of performing touch force sensing;

DETAILED DESCRIPTION OF THE EXEMPLARY EMBODIMENTS

Figure 1:
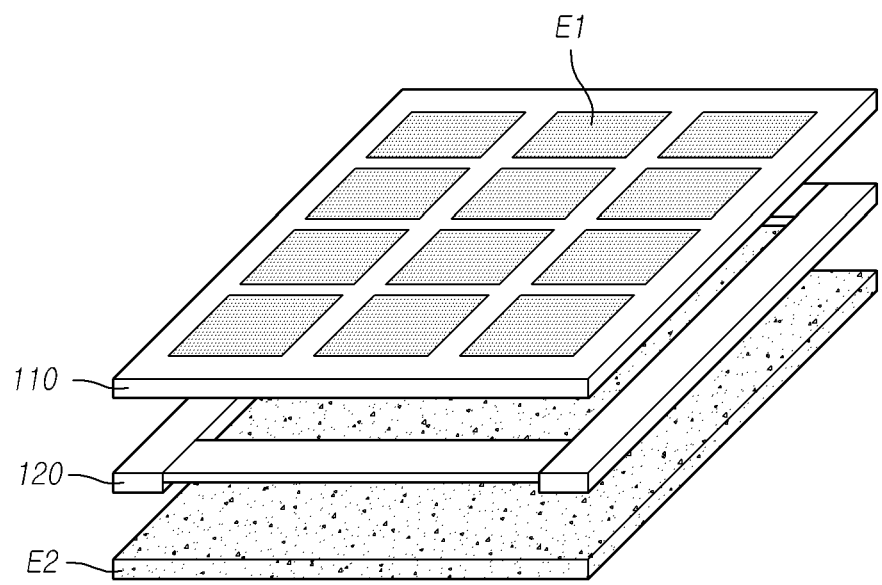
FIG. 1 is a drawing illustrating a schematic configuration of a display device according to embodiments of the present invention, which are capable of performing touch force sensing.

Hereinafter, some embodiments of the present invention will be described in detail with reference to the accompanying illustrative drawings. In designating elements of the drawings by reference numerals, the same elements will be designated by the same reference numerals although they are shown in different drawings. Further, in the following description of the present invention, a detailed description of known functions and configurations incorporated herein will be omitted when it may make the subject matter of the present invention rather unclear.

In addition, terms, such as first, second, A, B, (a), (b) or the like may be used herein when describing components of the present invention. These terms are merely used to distinguish one component from other components, and the property, order, sequence and the like of the corresponding component are not limited by the corresponding term. In the case that it is described that a certain structural element "is connected to", "is coupled to", or "is in contact with" another structural element, it should be interpreted that another structural element may "be connected to", "be coupled to", or "be in contact with" the structural elements as well as that the certain structural element is directly connected to or is in direct contact with another structural element.

FIG. 1 is a view illustrating a schematic configuration of a display device 100 according to embodiments of the present invention, which are capable of performing touch force sensing. FIG. 1 mainly illustrates a structure related to the touch force sensing in the display device 100.

Referring to FIG. 1, a display device 100 according to the embodiments of the present invention includes a display panel 110 having a plurality of first electrodes E1 embedded therein, a guide panel 120 located below the display panel 110 to support the display panel 110, a second electrode E2 disposed to be spaced apart from the rear surface of the display panel 110, and a touch circuit that senses a touch position and a touch force by applying a first electrode driving signal to the plurality of first electrodes E1 and applying a second electrode driving signal to the second electrode E2 during a touch driving period of the display panel 110.

The plurality of first electrodes E1 sequentially receive the first electrode driving signal that is output and applied from the touch circuit during the touch driving period of the display panel 110.

When a touch to the display panel 110 is generated by a pointer, such as a user's finger, during the touch driving period of the display panel 110, the touch circuit sense a touch and a touch position using a capacitance change between the pointer and the first electrodes E1.

The second electrode E2 is positioned outside the display panel 110 and disposed to be spaced apart from the rear surface of the display panel 110 and to maintain a predetermined gap with the plurality of first electrodes E1 embedded in the display panel 110. The second electrode E2 receives the second electrode driving signal that is applied from the touch circuit during the touch driving period of the display panel 110.

When a vertical load is generated by the user's touch to the display panel 110 during the touch driving period of the display panel 110, a capacitance change occurs between the first electrodes E1 and the second electrode E2 due to the change of the gap between the first electrodes E1 and the second electrode E2.

The touch circuit senses a touch force caused by the user's touch to the display panel 110 by using the capacitance change between the first electrodes E1 and the second electrode E2 during the touch driving period of the display panel 110.

The guide panel 120 is disposed at the lower portion of the display panel 110 along the edge of the display panel 110 so as to support the display panel 110 such that a gap can be present between the plurality of first electrodes E1 embedded in the display panel 110 and the second electrode E2.

Other structures may be disposed inside the guide panel 120. For example, a light source, a light guide plate, an optical sheet, and the like may be disposed.

In addition, the first electrode driving signal and the second electrode driving signal output from the touch circuit may be applied to the first electrodes E1 or the second electrode E2 through a flexible printed circuit. Hereinafter, an arrangement structure of a flexible printed circuit that is included in the display device 100 will be described with reference to FIG. 2.

Figure 2:
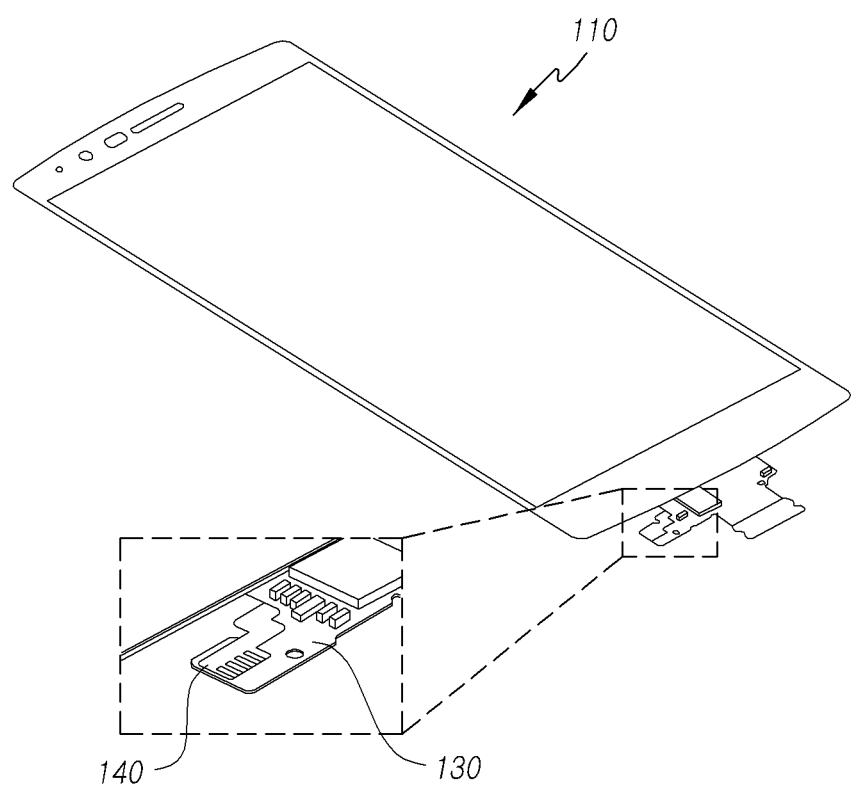
FIG. 2 is a drawing illustrating exemplary structures of a display panel and a flexible printed circuit of the display device according to the embodiments of the present invention, which are capable of performing touch force sensing.

FIG. 2 illustrates a display panel 110 and a flexible printed circuit connected to a lower portion of the display panel 110 in the display device 100 according to the embodiments of the present invention.

Referring to FIG. 2, a first flexible printed circuit 130 electrically connected to the display panel 110, a second flexible printed circuit 140 electrically connected to the first flexible printed circuit 130 may be located below the display panel 110.

The first flexible printed circuit 130 is electrically connected to the display panel 110 and transmits a first electrode driving signal, which is output from the touch circuit during the touch driving period, to a plurality of first electrodes E1 embedded in the display panel 110. The first flexible printed circuit 130 may be a panel flexible printed circuit.

The second flexible printed circuit 140 is electrically connected to the first flexible printed circuit 130 so as to receive, from the first flexible printed circuit 130, a second electrode driving signal, which is output from the touch circuit during the touch driving period, and to transmit the second electrode driving signal to the second electrode E2 disposed to be spaced apart from the rear surface of the display panel 110. The second flexible printed circuit 140 may be an LED flexible printed circuit.

Alternatively, the touch circuit may only output the first electrode driving signal during the touch driving period, and a level shifter located in the first flexible printed circuit 130, which receives the first electrode driving signal, may convert the amplitude of the first electrode driving signal to output the second electrode driving signal.

In order to sense a touch force in the structure of the display device 100 capable of performing touch force sensing, a gap shall be present between the plurality of first electrodes E1 included in the display panel 110 and the second electrode E2. Thus, the second electrode E2 is disposed to be spaced apart from the rear surface of the display panel 110 by a predetermined distance.

Accordingly, it is necessary to provide a connecting medium that can transmit the second electrode driving signal, which is transmitted by the second flexible printed circuit 140 during the touch driving period of the display panel 110, to the second electrode E2 disposed to be spaced apart from the rear surface of the display panel 110. The addition of the connecting medium in the display device 100 may affect the compact configuration of the display device 100 capable of performing touch force sensing.

The embodiments of the present invention provide a display device 100 that is capable of sensing a touch force of a user's touch to the display panel 110 and compactly implementing a transmission path of an electrode driving signal applied during the touch driving period of the display panel 110 while minimizing the structural change of the display device 100.

Further, the embodiments of the present invention provide a structure of the display device 100 that is capable of simultaneously applying the second electrode driving signal applied to the second electrode E2 and the ground signal applied to the ground electrode 160 located below the second electrode E2.

Figure 3:
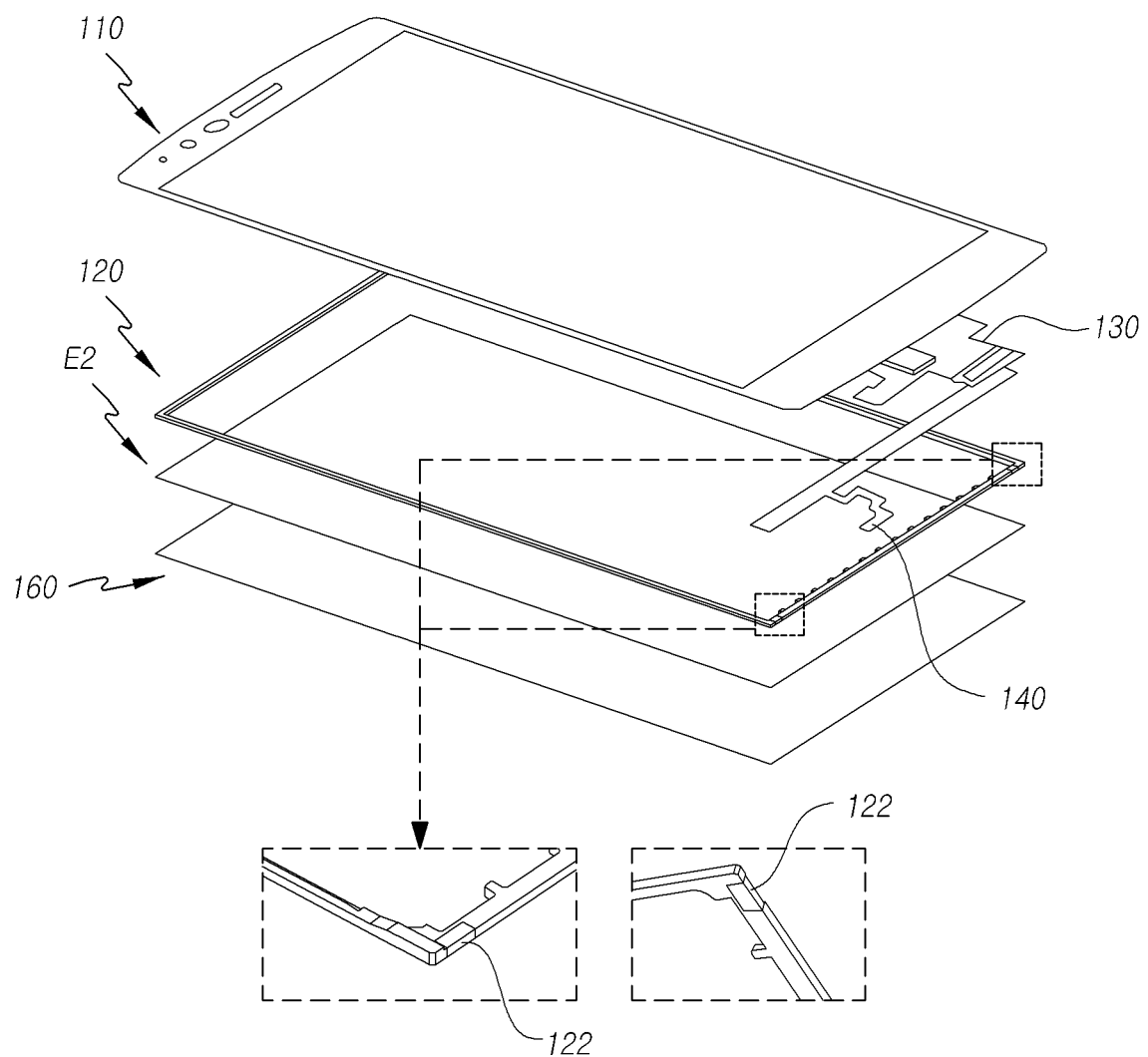
FIG. 3 is a drawing illustrating a detailed configuration of the display device according to the embodiments of the present invention, which are capable of performing touch force sensing.
Figure 5A:
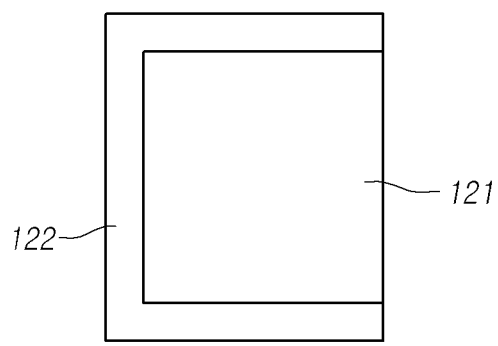
Figure 5B:
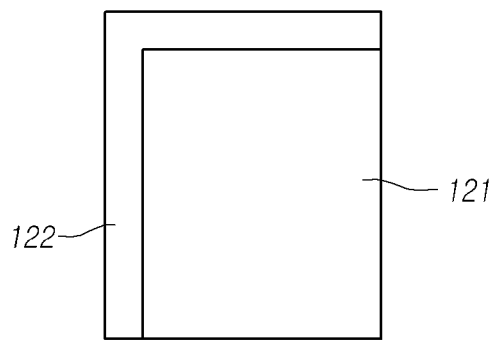
Figure 5C:
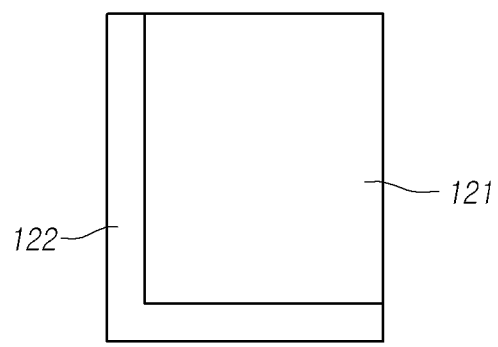
Figure 5D:
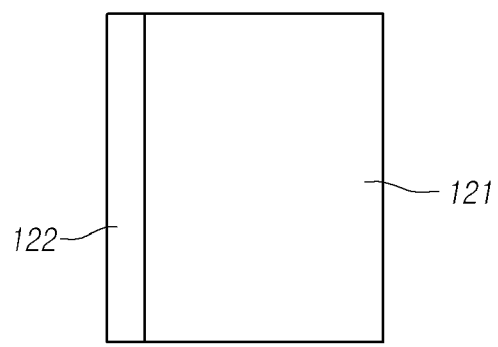

FIG. 3 illustrates an exemplary structure in which a path for transmitting a signal to an electrode located below the guide panel 120 is implemented in the display device 100 according to the embodiments of the present invention, which are capable of performing touch force sensing.

The embodiments of the present invention provide an improved path for transmitting a signal to an electrode located below the display device 100 by improving the structure of the guide panel 120 or the second flexible printed circuit 140, which is included in the display device 100.

FIG. 3 illustrates an example in which a path for transmitting a signal is provided by improving the structure of the guide panel 120 in an instance in which both of a structure for transmitting a second electrode driving signal and a structure for transmitting a ground signal are included.

Referring to FIG. 3, the display device 100 according to the embodiments of the present invention includes a display panel 110 having a plurality of first electrodes E1 embedded therein, a first flexible printed circuit 130 electrically connected to the display panel 110, a second flexible printed circuit 140 electrically connected to the first flexible printed circuit 130, a guide panel 120 disposed below the display panel 110 to support the display panel 110, a second electrode E2 located below the guide panel 120 and spaced apart from the plurality of first electrodes E1, and a ground electrode 160 located below the second electrode E2.

The guide panel 120 may include conductive patterns 122 and 123 in a part of the outer surface of the guide panel 120. According to the configuration of an electrode located below the guide panel 120, the guide panel 120 may include only the first conductive pattern 122 or the second conductive pattern 123, or may include the first conductive pattern 122 and the second conductive pattern 123.

The conductive patterns 122 and 123 may be formed to wrap the outer surface of the guide panel 120. For example, the conductive patterns 122 and 123 may be formed in a "i" shape to wrap the top surface, the outer surface, and the bottom surface of the guide panel 120.

One side of the first conductive pattern 122 is electrically connected to a portion where the second electrode driving signal is output in the second flexible printed circuit 140, and the other side is electrically connected to the second electrode E2.

One side of the second conductive pattern 123 is electrically connected to a portion where the ground signal is output in the second flexible printed circuit 140, and the other side is electrically connected to the ground electrode 160 located below the second electrode E2.

The second electrode driving signal is output from the second flexible printed circuit 140, and transmitted to the second electrode E2 via the first conductive pattern 122 of the guide panel 120.

The ground signal is output from the second flexible printed circuit 140, and transmitted to the ground electrode 160 via the second conductive pattern 123 of the guide panel 120.

Thus, according to the embodiments of the present invention, the conductive patterns 122 and 123 are provided in a part of the outer surface of the guide panel 120 included in the display device 100 such that a signal output from a signal input medium located above the guide panel 120 is easily transmitted to an electrode located below the guide panel 120.

In addition, the conductive patterns 122 and 123 may be configured differently according to the structure of the electrode located below the guide panel 120 so as to provide a signal transmission path suitable for the structure of the display device 100.

Hereinafter, various embodiments of the present invention for implementing a signal transmission path in the display device 100 according to the embodiments of the present invention will be described in detail with reference to a configuration in which a signal transmission path is implemented.

FIG. 4 illustrates a structure of a guide panel 120 included in the display device 100 according to the first embodiment of the present invention. The guide panel 120 according to the first embodiment of the present invention is characterized in that it provides a path for the second electrode driving signal applied to the second electrode E2 while allowing a gap to exist between the plurality of first electrodes E1 and the second electrode E2.

Referring to FIG. 4, the guide panel 120 according to the first embodiment of the present invention is located below the display panel 110, and includes a body portion 121 having a rectangular peripheral shape and supporting the display panel 110 in which a plurality of first electrodes E1 are embedded and the second electrode E2 to be spaced apart from each other, and a first conductive pattern 122 implemented in a part of the outer surface of the body portion 121 and serving as a signal transmission path.

The body portion 121 is disposed along the peripheral edges of the display panel 110 to support the display panel 110 and to cause the display panel 110 and the second electrode E2 to be spaced apart from each other such that a gap may exist between the plurality of first electrodes E1 embedded in the display 110 and the second electrode E2.

The first conductive pattern 122 may be formed in a three-dimensional shape in a part of the outer surface of the body portion 121. For example, the first conductive pattern 122 may be implemented in a "⊏" shape to wrap the top surface, the outer surface, and the bottom surface of the body portion 121.

Alternatively, as illustrated in FIGS. 5A to 5D, besides the "⊏" shape (FIG. 5A), the first conductive pattern 122 may be variously implemented, for example, in a "⌐" shape to wrap the top surface and the outer surface of the body portion 121 (FIG. 5B), in an "L" shape to wrap the outer surface and the bottom surface of the body 121 (FIG. 5C), or in an "l" shape to be positioned on the outer surface of the body portion 121 (FIG. 5D), as long as the first conductive pattern 122 can transmit a signal output from the signal input medium located above the panel 120 to the second electrode E2 located below the guide panel 120.

The first conductive pattern 122 may be implemented on the outer surface of the body portion 121 by using a Laser Direct Structure (LDS) technique, or by forming a thin metal and performing an insert injection molding.

In the instance of implementing the first conductive pattern 122 using the LDS technique, the body portion 121 of the guide panel 120 is injection molded first, then the body portion 121 is irradiated with a laser at a position where the first conductive pattern 122 is to be implemented, and then a plating processing is performed at the position so that a desired pattern can be finally realized.

The first conductive pattern 122 may be formed of a metal. For example, the first conductive pattern 122 may be formed of Cu, Ni, Ti, Al, Cr, Mo, Ag, or a combination thereof.

One side (the top surface) of the first conductive pattern 122 comes in contact with, or is electrically connected to, a portion where the second electrode driving signal is output in the second flexible printed circuit 140 via a conductive double-sided tape, in which the second flexible printed circuit 140 is a signal input medium of the second electrode driving signal. In addition, the other side (e.g., the bottom surface) of the first conductive pattern 122 comes in contact with, or is electrically connected to, the second electrode E2 via a conductive double-sided tape.

Accordingly, by implementing the first conductive pattern 122 in a part of the outer surface of the body portion 121 of the guide panel 120, it is possible to provide a compact signal transmission structure by allowing the second electrode driving signal output from the second flexible printed circuit 140 to be applied to the second electrode E2 through the first conductive pattern 122 of the guide panel 120.

Figure 6:
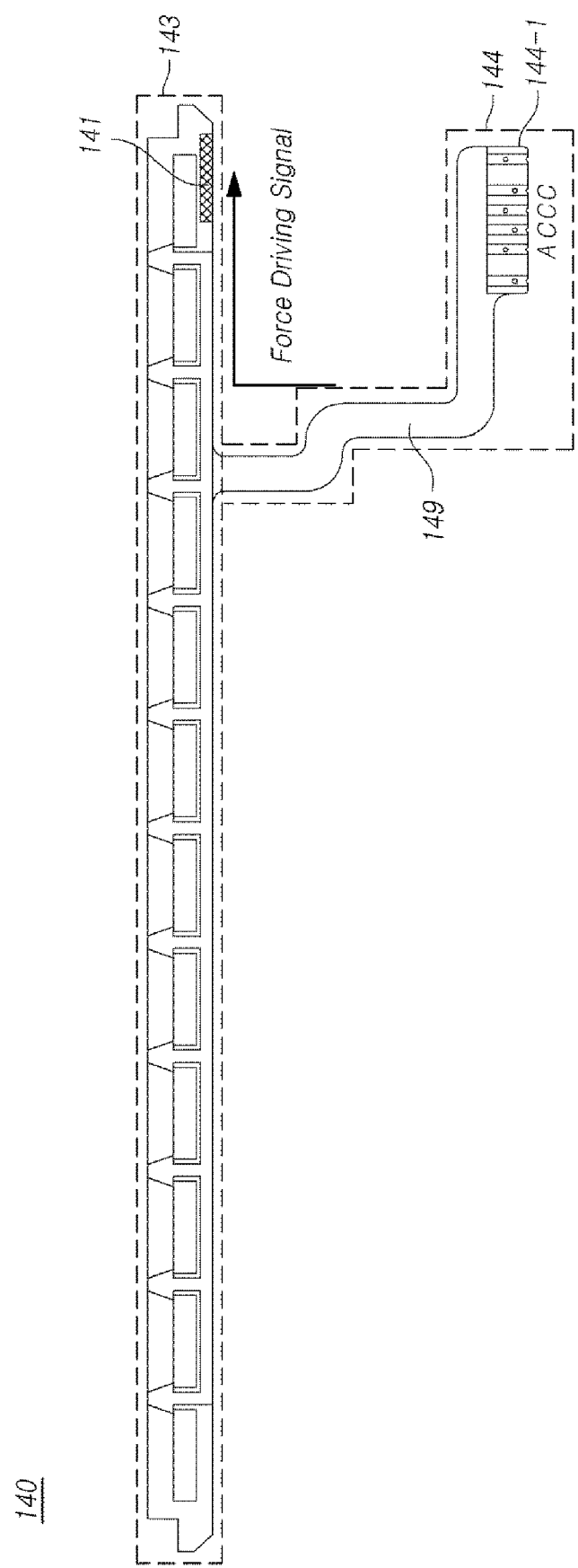

FIG. 6 is a front view illustrating an exemplary structure of the second flexible printed circuit 140 that transmits the second electrode driving signal to the first conductive pattern 122 of the guide panel 120 included in the display device 100 according to the first embodiment of the present invention.

Referring to FIG. 6, the second flexible printed circuit 140 includes a main circuit portion 143, a protrusion 144 where a signal input terminal 144-1 is located, and a first pad portion 141 formed in an outskirt portion of the second flexible printed circuit 140.

The signal input terminal 144-1 located at the end portion of the protrusion 144 includes a second electrode drive signal terminal to which the second electrode drive signal is input, in addition to LED drive pins.

The first pad portion 141 located at the outskirt portion of the second flexible printed circuit 140 is formed to electrically communicate with the first conductive pattern 122 that is implemented on the guide panel 120 at a portion where the second flexible printed circuit 140 is in contact with the guide panel 120.

The second electrode driving signal is input to the second electrode driving signal terminal of the second flexible printed circuit 140, and is transmitted to the first pad portion 141 located at a portion electrically connected to the pattern 122 of the guide panel 120 along a signal wiring 149 arranged in the second flexible printed circuit 140.

In addition, the second electrode driving signal is transmitted to the second electrode E2 through the first conductive pattern 122 electrically connected to the first pad portion 141.

On the other hand, according to another embodiment of the present invention, it is possible to provide a configuration in which a signal can be transmitted to the second electrode E2 through the second flexible printed circuit 140 by improving the structure of the position where the second electrode driving signal is output from the second flexible printed circuit 140 without implementing the conductive pattern on the outer surface of the guide panel 120.

Figure 7:
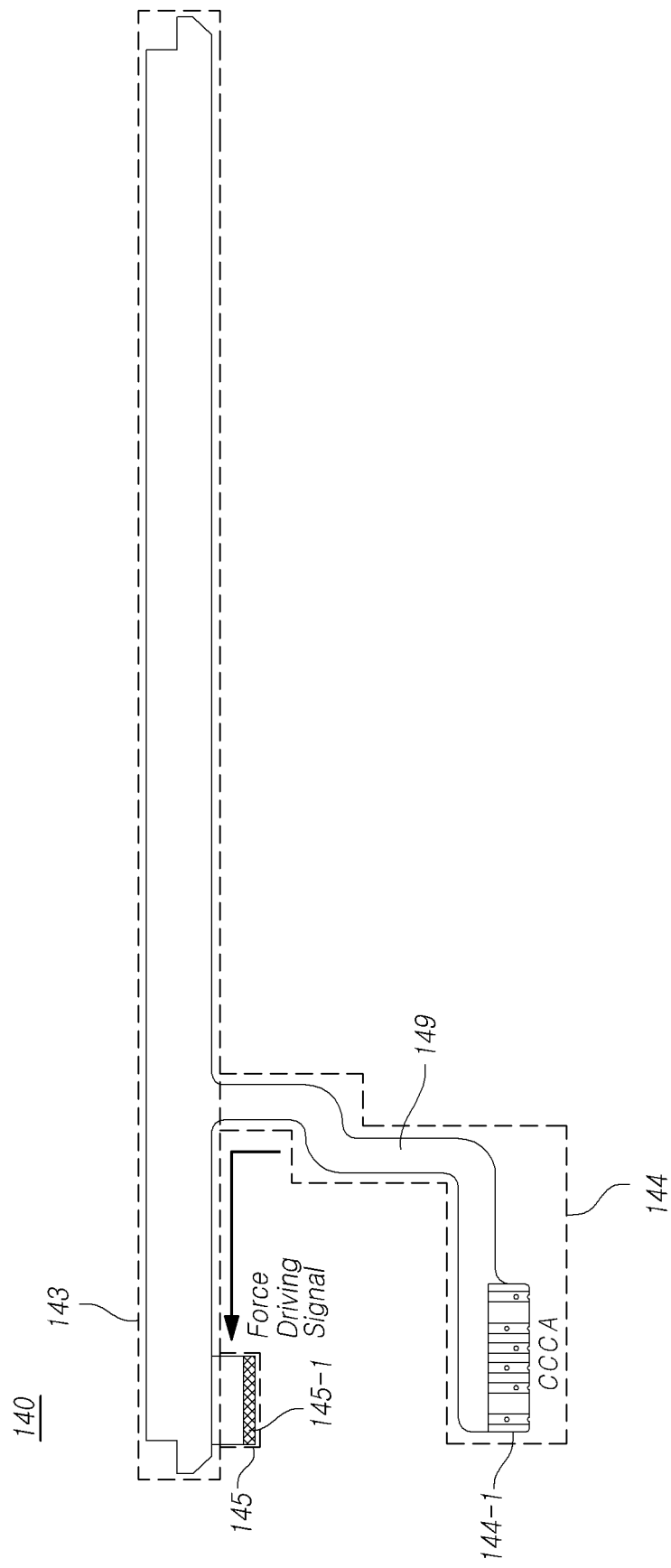
FIGS. 7 and 8 are drawings each illustrating an exemplary structure of a flexible printed circuit that is included in a display device according to a second embodiment of the present invention, which is capable of performing touch force sensing.
Figure 8:
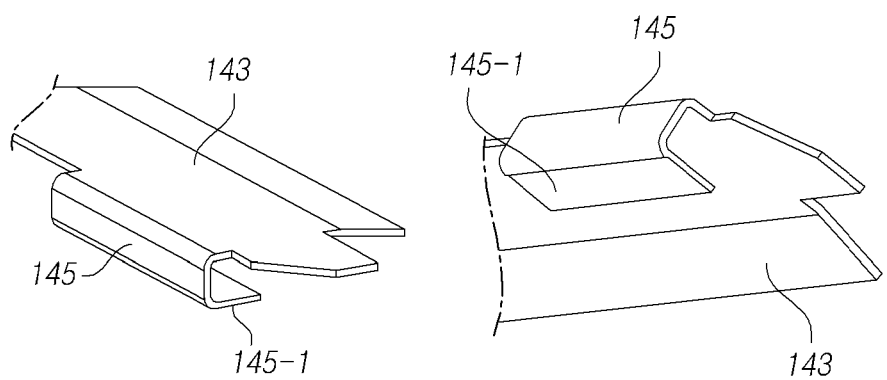

FIGS. 7 and 8 illustrate a structure of a second flexible printed circuit 140 according to a second embodiment of the present invention. FIG. 7 is a rear view illustrating an exemplary structure in which a first folding portion 145 is formed at a position where the second electrode driving signal is output, and FIG. 8 is a view illustrating the first folding portion 145 in an enlarged scale.

Referring to FIGS. 7 and 8, the second flexible printed circuit 140 according to the second embodiment of the present invention includes the first folding portion 145 formed in a structure in which the second flexible print circuit 140 extends to be folded, at a position where the second electrode driving signal is output. For example, the first folding portion 145 may be formed by the second flexible printed circuit 140 extending at one side of the main circuit portion 143 of the second flexible printed circuit 140.

The first folding portion 145 may be formed in a shape in which the second flexible printed circuit 140 protrudes and wraps the guide panel 120 located below the second flexible printed circuit 140.

Alternatively, the first folding portion may be formed in a structure that extends downward along the side surface of the guide panel 120 located below the second flexible printed circuit 140, and may be formed in any of all the structures in which the first folding portion 145 of the second flexible printed circuit 140 is capable of coming in contact with a structure located below the guide panel 120, thereby transmitting a signal thereto.

The end portion 145-1 of the first folding portion 145 located in the portion where the second electrode driving signal is output is electrically connected to the second electrode E2 located below the guide panel 120.

Therefore, the second electrode driving signal input to the signal input terminal 144-1 of the second flexible printed circuit 140 is transmitted to the second electrode E2 via the signal wiring 149 of the second flexible printed circuit 140 and the first folding portion 145, so that the signal can be transmitted even if the first conductive pattern 122 is not present on the outer surface of the guide panel 120 located between the second flexible printed circuit 140 and the second electrode E2.

Figure 9:
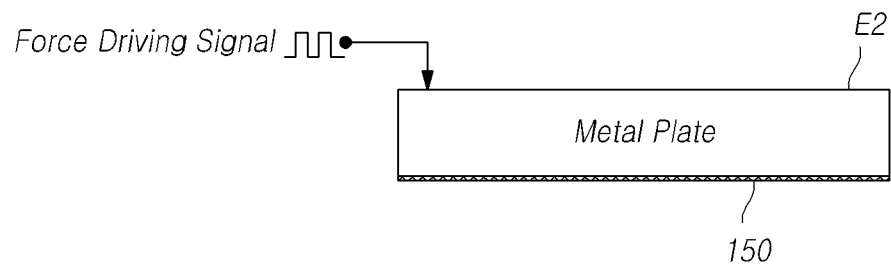
FIGS. 9 and 10 are drawings each illustrating an exemplary structure of a second electrode that is included in a display device according to the first and second embodiments of the present invention, which are capable of performing touch force sensing.
Figure 10:
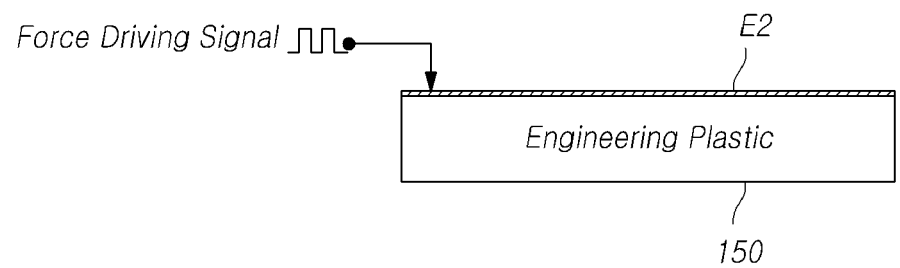

FIGS. 9 and 10 illustrate various exemplary implementation types of the second electrode E2 located below the guide panel 120 in the display devices 100 according to the first and second embodiments of the present invention.

Since the second electrode E2 should serve as a reference electrode, it is necessary to secure rigidity of a predetermined level or more. For this purpose, a material, such as an engineering plastic, a composite material, or a metal material, may be applied, and a combination of various materials may also be applied.

FIG. 9 illustrates an example in which the second electrode E2 is formed of a metal plate in which an insulating layer 150 is disposed under the second electrode E2 formed of the metal plate. That is, this is the instance in which the lower plate itself performs the function of the second electrode E2, and the rigidity can be maintained by using the metal plate having a predetermined thickness as the second electrode E2.

Referring to FIG. 10, an engineering plastic serving as an insulating layer 150 may be disposed, and a conductive material may be coated on the top side of the engineering plastic so as to form the second electrode E2. That is, the rigidity of a predetermined level or more can be maintained through the engineering plastic, and the conductive material coated on the top side thereof is configured to perform the function of the second electrode E2.

Accordingly, the lower plate may be variously implemented depending on the material that performs the function of the second electrode E2.

In addition, the display device 100 according to the exemplary embodiments of the present invention may provide a path through which a ground signal is transmitted to the ground electrode 160 included in the lower plate by improving the structure of the guide panel 120 or the second flexible printed circuit 140.

That is, a second electrode driving signal transmission path and a ground signal transmission path may be provided at the same time. Hereinafter, the structure of the display apparatus 100 including the ground signal transmission path will be described with reference to FIGS. 11 to 15.

Figure 11:
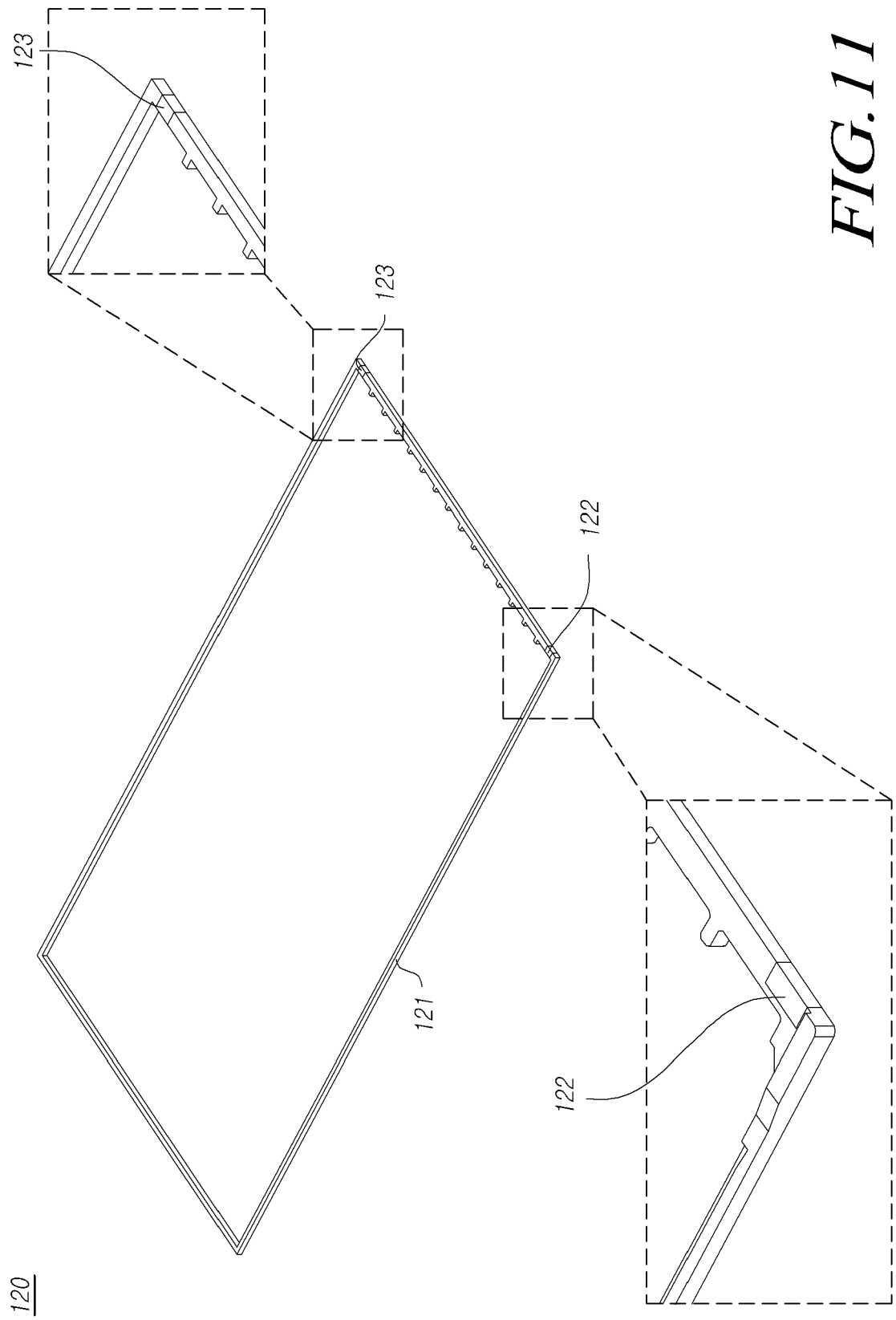
FIGS. 11 and 12 are drawings each illustrating exemplary structures of a guide panel and a flexible printed circuit that are included in a display device according to a third embodiment of the present invention, which is capable of performing touch force sensing.
Figure 12:
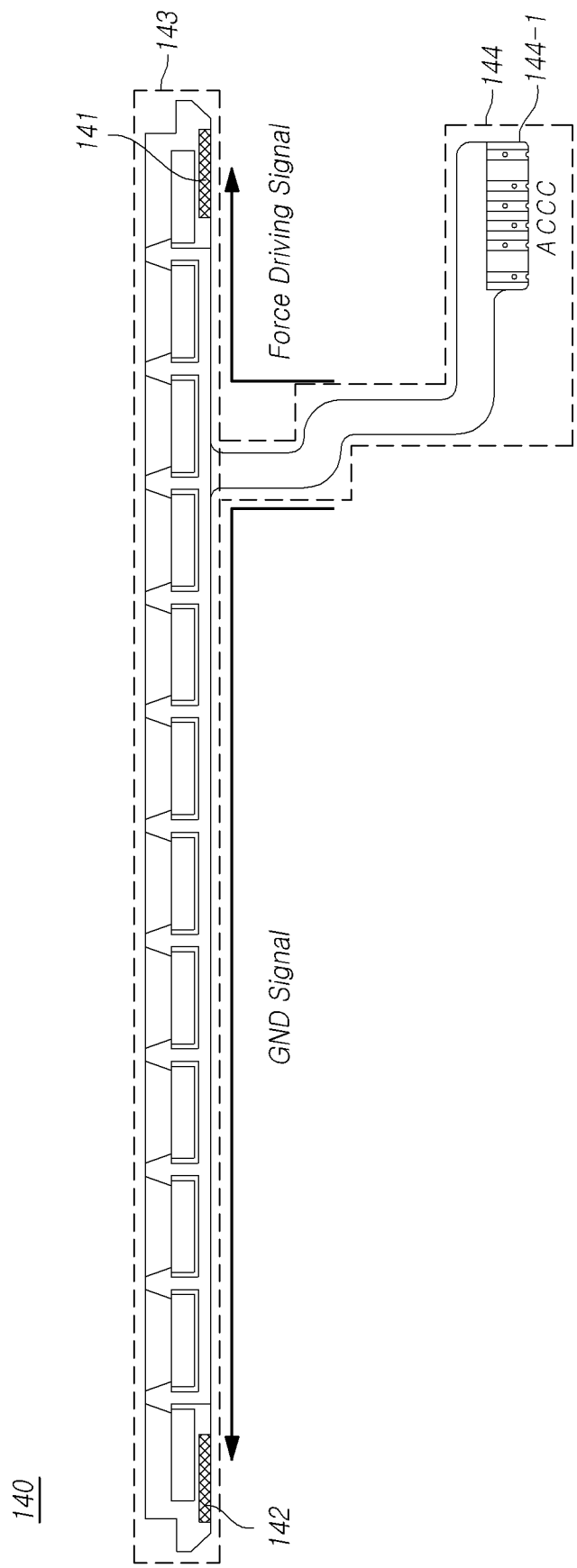

FIGS. 11 and 12 illustrate structures of a guide panel 120 and a second flexible printed circuit 140 which are included in a display device 100 according to a third embodiment of the present invention.

Referring to FIG. 11, the guide panel 120 includes: a body portion 121 supporting a display panel 110 in which a plurality of first electrodes E1 are embedded and a second electrode E2 to be spaced apart from each other; a first conductive pattern 122 implemented in a part of the outer surface of the body portion 121; and a second conductive pattern 123.

That is, according to the third embodiment of the present invention, the second conductive pattern 123 is implemented on the outer surface of the guide panel 120 separately from the first conductive pattern 122.

Referring to FIG. 12, the second flexible printed circuit 140 according to the third embodiment of the present invention further includes a second pad portion 142 in a portion in which the second flexible printed circuit 140 is in contact with the second conductive pattern 123 of the guide panel 120.

One side of the first conductive pattern 122 of the guide panel 120 is in contact with or is electrically connected, via a conductive double-sided tape, to the first pad portion 141 of the second flexible printed circuit 140, and the other side is in contact with, or is electrically connected, via a conductive double-sided tape, to the second electrode E2 located below the guide panel 120.

One side of the second conductive pattern 123 of the guide panel 120 is in contact with or is electrically connected, via a conductive double-sided tape, to the second pad portion 142 of the second flexible printed circuit 140, and the other side is in contact with or is electrically connected, via a conductive double-sided tape, to the ground electrode 160 located below the second electrode E2.

Accordingly, the second electrode driving signal and the ground GND signal may be easily transmitted to the second electrode E2 and the ground electrode 160 located below the guide panel 120 through the conductive pattern 122 and 123 formed on a part of the outer surface of the guide panel 120.

In addition, the second electrode driving signal transmission path and the ground signal transmission path may be provided by improving the structure of the second flexible printed circuit 140 without implementing the conductive patterns 122 and 123 on the outer surface of the guide panel 120.

Figure 13:
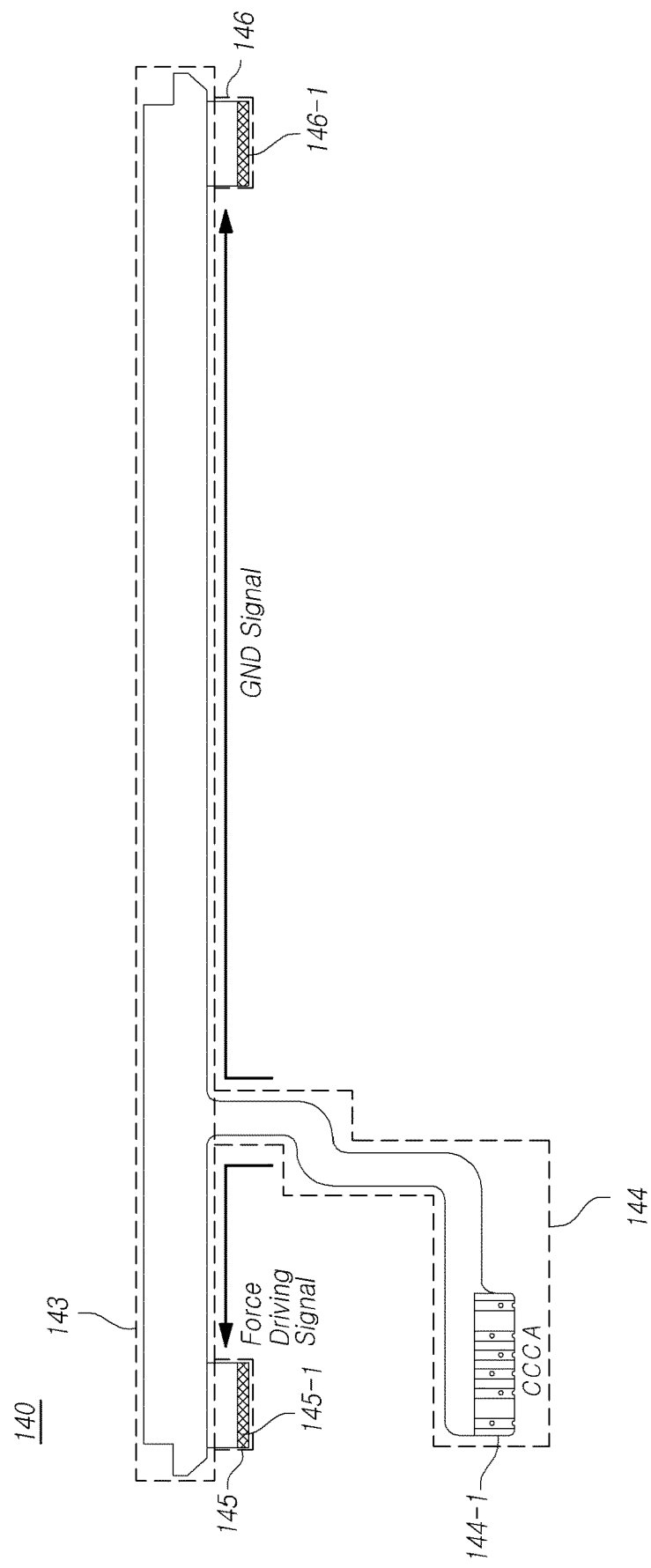
FIG. 13 is a drawing each illustrating an exemplary structure of a flexible printed circuit that is included in a display device according to a fourth embodiment of the present invention, which is capable of performing touch force sensing.

FIG. 13 is a rear view illustrating an exemplary structure of a second flexible printed circuit 140 according to a fourth embodiment of the present invention.

Referring to FIG. 13, the second flexible printed circuit 140 according to the fourth embodiment of the present invention includes a second electrode driving signal terminal to which a second electrode driving signal is input, and a ground signal terminal to which a ground signal is input, in addition to an LED driving pin, in a signal input terminal 144-1 located at an end portion of the protrusion 144.

The second flexible printed circuit 140 includes a first folding portion 145 formed by extending and folding the second flexible printed circuit 140 at a position where the second electrode driving signal is output, and a second folding portion 146 formed by extending and folding the second flexible printed circuit 140 at a position where the ground signal is output. For example, the first folding portion 145 may be located at one side of the main circuit portion 143 and the second folding portion 146 may be located at the other side of the main circuit portion 143.

The first folding portion 145 and the second folding portion 146 may be formed in a shape in which the second flexible printed circuit 140 protrudes and wraps the guide panel 120 located below the second flexible printed circuit 140.

The end portion 145-1 of the first folding portion 145 is electrically connected to the second electrode E2 located below the guide panel 120, and the end portion 146-1 of the second folding portion 146 is electrically connected to the ground electrode 160 located below the second electrode E2.

Therefore, the second electrode driving signal is transmitted to the second electrode E2 located below the guide panel 120 through the first folding portion 145, and the ground signal is transmitted to the ground electrode 160 located below the electrode E2 through the second folding portion 146.

Figure 14:
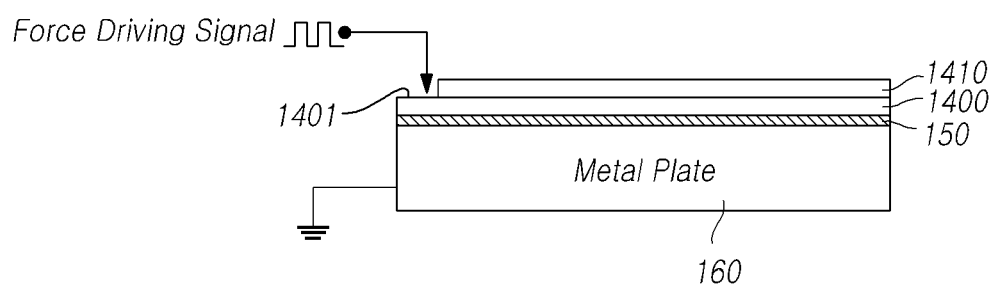
FIGS. 14 and 15 are drawings each illustrating exemplary structures of a second electrode and a ground electrode that are included in a display device according to the third and fourth embodiments of the present invention, which are capable of performing touch force sensing.
Figure 15:
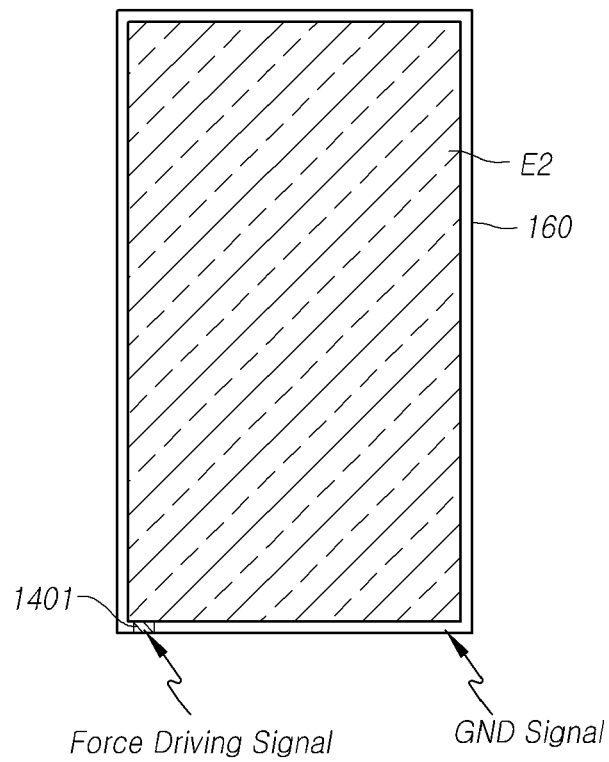

FIGS. 14 and 15 are a sectional view and a plan view illustrating an exemplary structure of the lower plate including the ground electrode 160 below the second electrode E2 in the display device 100 according to the third and fourth embodiments of the present invention. FIGS. 14 and 15 illustrate an example in which an insulating layer 150 is formed on the top surface of a metal plate that performs a function of the ground electrode 160, and a flexible printed circuit is laminated on the top surface of the insulating layer 150, so that the second electrode E2 is implemented.

Referring to FIG. 14, the second electrode E2 implemented by a flexible printed circuit includes a flexible copper foil laminated film 1400 and a cover layer 1410 located on the flexible copper foil laminate filmed film 1400, and in the portion where the second electrode driving signal is applied, the cover layer 1410 is removed so that a region 1401 where the copper foil of the flexible copper foil laminated film 1400 is exposed is present.

The region 1401 in which the copper foil of the flexible copper foil laminated film 1400 is exposed to the outside is electrically connected to the first conductive pattern 122 of the guide panel 120 or the first folding portion 145 of the second flexible printed circuit 140.

Accordingly, the second electrode driving signal can be applied through the region 1401 in which the copper foil of the flexible copper foil laminated film 1400 is exposed to the outside.

FIG. 15 is a plan view illustrating an instance where a second electrode E2 is implemented with a flexible printed circuit on a metal plate. Referring to FIG. 15, in a portion where the second electrode driving signal is applied to the second electrode E2, the cover layer 1410 is removed and the copper foil is exposed to the outside.

Accordingly, the second electrode driving signal is applied through the region 1401 where the copper foil is exposed to the outside in the second electrode E2 implemented by the flexible printed circuit.

In addition, the ground signal is applied through a portion that is electrically connected to the second conductive pattern 123 of the guide panel 120 or the second folding portion 146 of the second flexible printed circuit 140, in the ground electrode 160 implemented with a metal plate.

Each layer of the second electrode E2, which is implemented with a flexible printed circuit on the metal plate as in the above described examples, may be configured as in Table 1 below.

TABLE 1

| Layer Configuration | Class | Copper Non-Open Area | Copper Open Area |
|---|---|---|---|
| Cover layer 1410 | Polyimide | ○ | X |
|  | Adhesive | ○ | X |
| Flexible copper foil laminated film 1400 | Copper | ○ | ○ |
|  | Polyimide | ○ | ○ |

As described above, the display device 100 according to the embodiments of the present invention improves the structure of the guide panel 120 or the second flexible printed circuit 140 included in the display device 100 such that a simple signal transmission path can be realized for a touch force signal. Further, the structure of the display device 100 can be made compact.

Hereinafter, with reference to the cross-sectional views illustrated in FIGS. 16 to 20, descriptions will be made on the overall structure of the display device 100 to which the guide panel 120 according to the third embodiment of the present invention or the second flexible printed circuit 140 according to the fourth embodiment of the present invention is applied.

Figure 16:
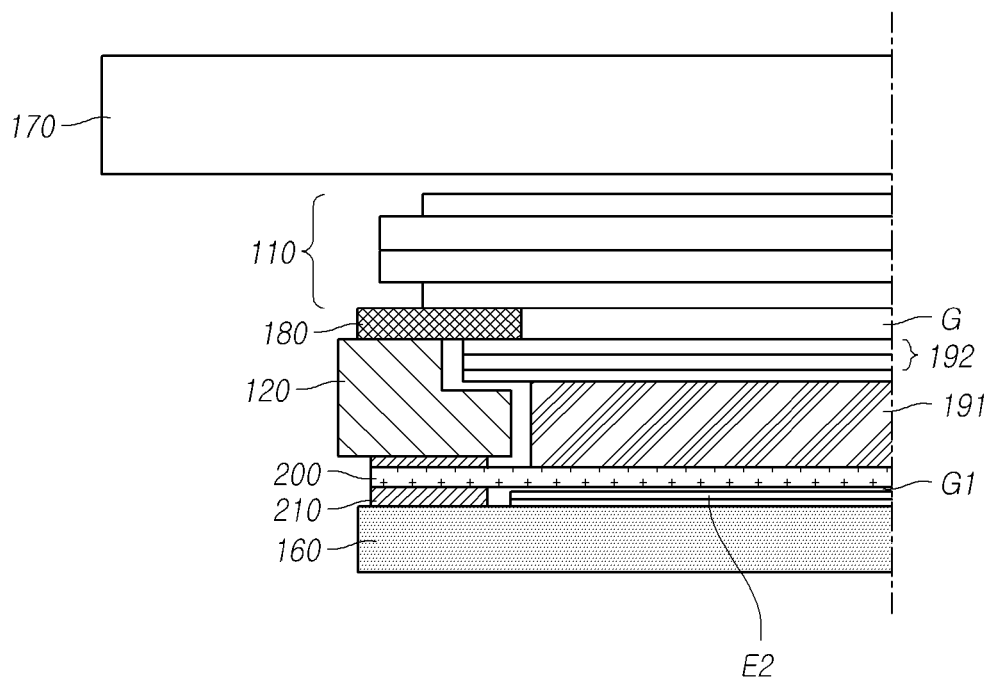
FIGS. 16 to 18 are drawings each illustrating a cross section of the display device according to the third embodiment of the present invention, which is capable of touch force sensing.
Figure 18:
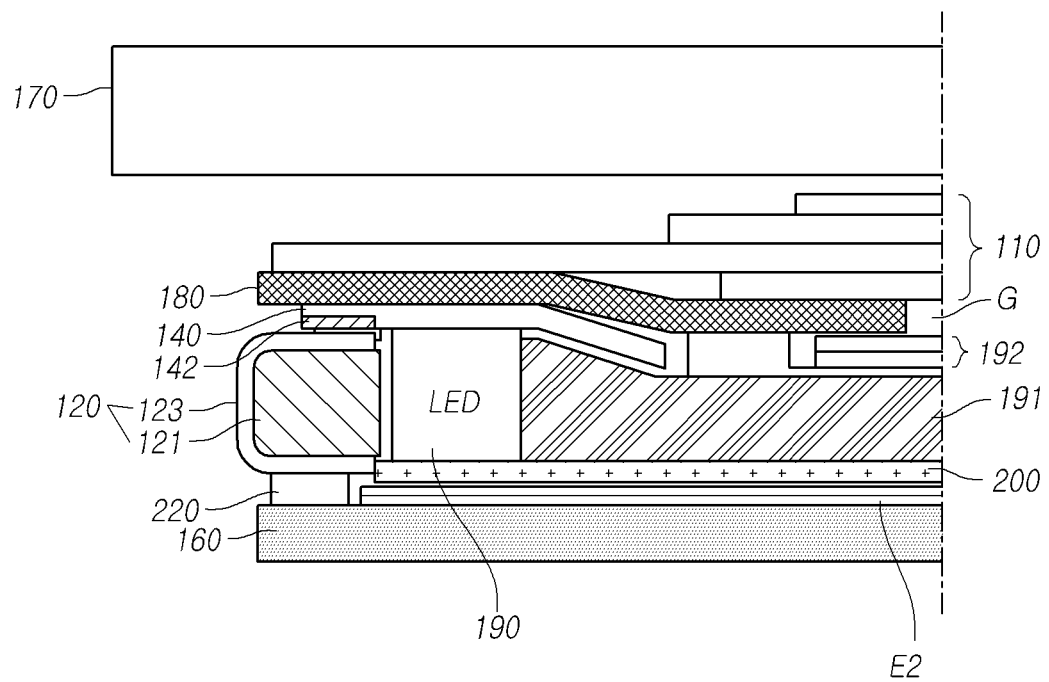

FIGS. 16 and 18 illustrate a cross section a structure of the display device 100 according to the third embodiment of the present invention. FIG. 16 illustrates a cross section of a portion which is a region other than a light incident portion and in which no signal transmission path is implemented by the guide panel 120.

Referring to FIG. 16, the display device 100 according to the third embodiment of the present invention includes a cover glass 170, a display panel 110 located below the cover glass 170 and having a plurality of first electrodes E1 embedded therein, a guide panel 120 located below the display panel 110 and supporting the display panel 110, a gap pad 180 interposed between the rear surface of the display panel 110 and the top surface of the guide panel 120, a second electrode E2 located below the guide panel 120, and a ground electrode 160 located below the second electrode E2.

A light guide plate 191, an optical sheet 192, and the like may be disposed inside the guide panel 120, and a reflection plate 200 may be disposed between the guide panel 120 and the second electrode E2.

The guide panel 120 may be designed to have a height that may make a predetermined gap exist between the rear surface of the display panel 110 and the top surface of the optical sheet 192.

The gap between the rear surface of the display panel 110 and the top surface of the optical sheet 192 may be designed to be about 0.1 mm to 0.2 mm. Through this, the optical sheet 192 can be prevented from being physically damaged due to deflection when the vertical load of a predetermined force is generated on the top surface of the cover glass 170.

Alternatively, a gap pad 180 may be interposed between the rear surface of the display panel 110 and the top surface of the guide panel 120 such that a gap G is formed between the rear surface of the display panel 110 and the top surface of the optical sheet 192.

The reflection plate 200 may be disposed between the rear surface of the light guide plate 191 and the top surface of the second electrode E2. The reflection plate 200 may be bonded to the guide panel 120 or the ground electrode 160 via a double-sided tape 210 having good fluidity in order to prevent wrinkles that may occur under a high temperature/high humidity environment.

The reflection plate 200 may be formed of a dielectric material to improve optical efficiency, and may form a dielectric gap between the plurality of first electrodes E1 and the second electrode E2 to be capable of performing touch force sensing.

In addition, a predetermined gap G1 may exist between the reflection plate 200 and the second electrode E2 located below the reflection plate 200. That is, a dielectric gap or an air gap may be formed between the plurality of first electrodes E1 and the second electrode E2 by disposing the reflection plate 200 made of a dielectric material and making a predetermined gap G1 exist between the reflection plate 200 and the second electrode E2.

Figure 17:
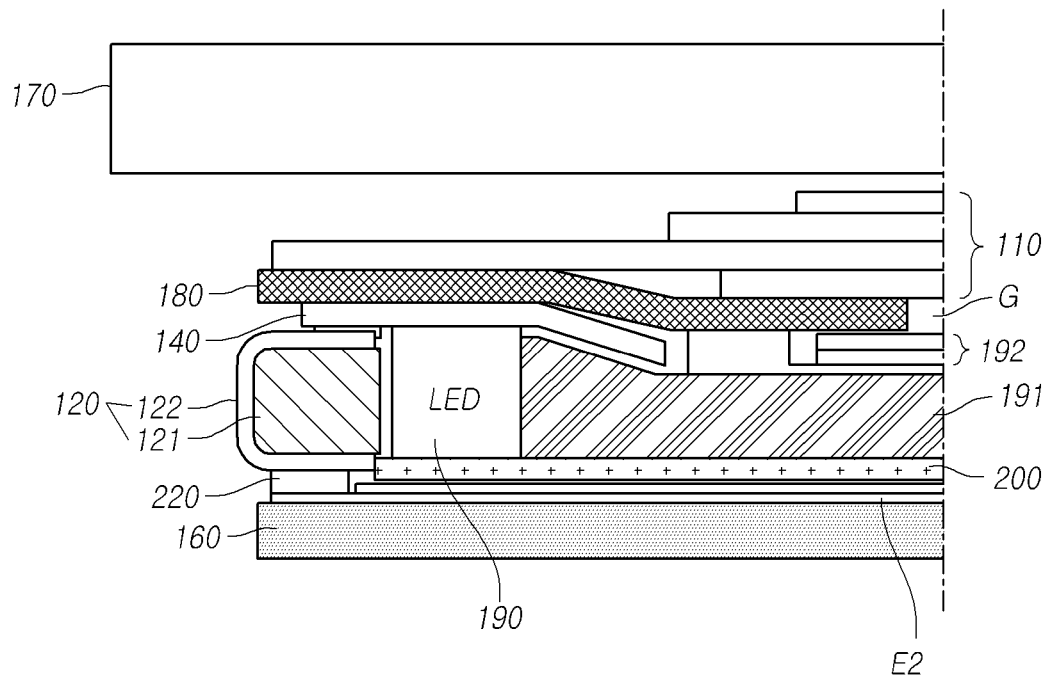

FIGS. 17 and 18 illustrate cross sections of portions each of which is a light incident region and in which a signal transmission path is implemented through conductive patterns 122 and 123 of a guide panel 120. FIG. 17 illustrates a structure of a portion to which a second electrode driving signal is applied, and FIG. 18 illustrates a structure of a portion to which a ground signal is applied.

Referring to FIG. 17, a gap pad 180 is disposed on the rear surface of the display panel 110 so that a gap G exists between the rear surface of the display panel 110 and the top surface of the optical sheet 192, and the second flexible printed circuit 140 is located below the gap pad 180. The gap pad 180 may not be included depending on the design height of the guide panel 120.

The guide panel 120 is positioned below the second flexible printed circuit 140, and the first pad portion 141 from which the second electrode driving signal is output in the second flexible printed circuit 140 comes in contact with or is bonded, via a conductive double-sided tape 220, to one side of the first conductive pattern 122 of the guide panel 120.

In addition, the other side of the first conductive pattern 122 of the guide panel 120 is bonded to the second electrode E2 located below the guide panel 120 via a conductive double-sided tape 220.

Accordingly, the second electrode driving signal, which is output from a touch circuit during the touch driving period of the display panel 110 and is input to the second flexible printed circuit 140, is transmitted to the second electrode E2 located below the guide panel 120 through the first conductive pattern 122 of the guide panel 120, which is electrically connected to the first pad portion 141 of the second flexible printed circuit 140.

FIG. 18 illustrates a structure of a portion in which a ground signal is transmitted to the ground electrode 160 located below the guide panel 120 through the second conductive pattern 123 of the guide panel 120.

Referring to FIG. 18, a second pad portion 142 positioned at a portion where the ground signal is output from the second flexible printed circuit 140 located below the display panel 110 comes in contact with or is electrically connected, via the conductive double-sided tape 220, to one side of the second conductive pattern 123 of the guide panel 120.

In addition, the other side of the second conductive pattern 123 of the guide panel 120 is bonded to the ground electrode 160 located below the guide panel 120, via the conductive double-sided tape 220.

Accordingly, the ground signal output through the second flexible printed circuit 140 is transmitted to the ground electrode 160 located below the guide panel 120 through the second conductive pattern 123 implemented on the outer surface of the guide panel 120.

Here, it is possible to configure a backlight unit that includes a guide panel 120 provided with conductive patterns 122 and 123, a light source 190, for example a light emitting diode (LED), accommodated inside the guide panel 120, and a light guide plate 191 configured to supply light incident from the light source 190 to the display panel 110.

The backlight unit may further include an optical sheet 192 disposed on the top surface of the light guide plate 191 to diffuse the light supplied to the display panel 110, and a reflection plate 200 disposed on the bottom surface of the light guide plate 191 to improve optical efficiency.

When the backlight unit is formed of a dielectric material and disposed between the first and second electrodes E1 and E2, the reflection plate 200 may be configured to have a dielectric gap that may be formed between the first electrodes E1 and the second electrode E2.

Figure 19:
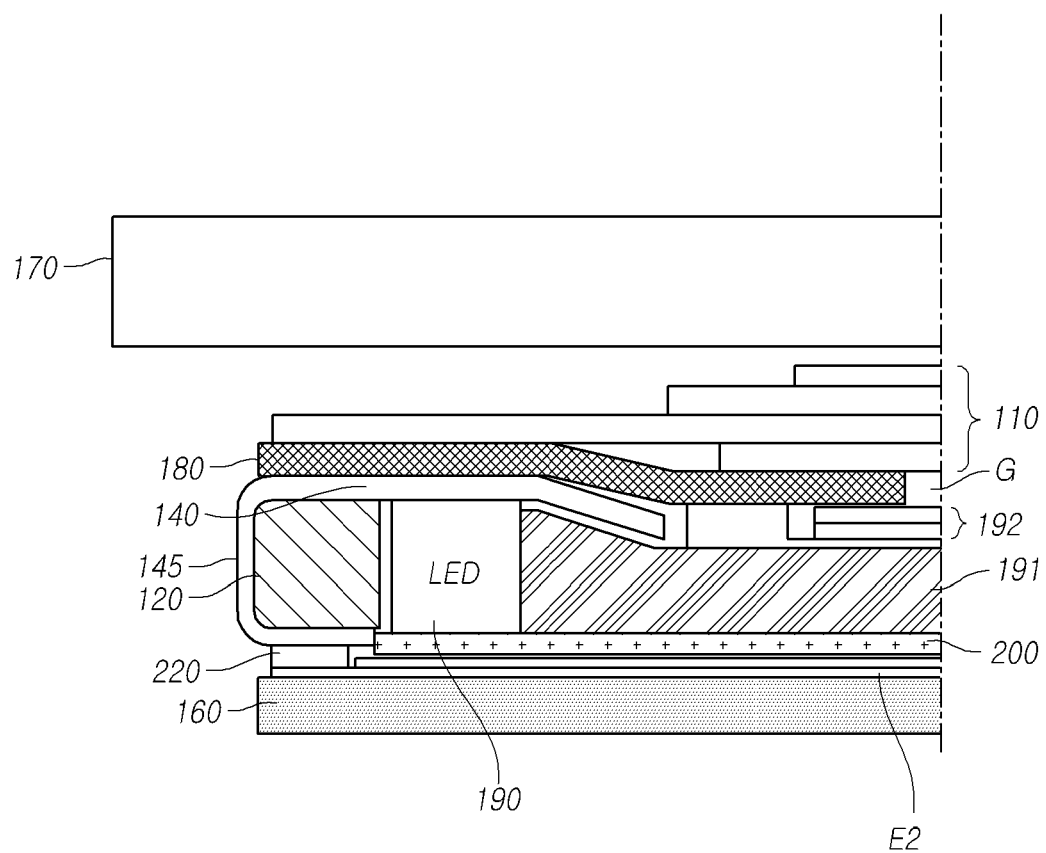
FIGS. 19 and 20 are drawings each illustrating a cross section of the display device according to the fourth embodiment of the present invention, which is capable of touch force sensing.
Figure 20:
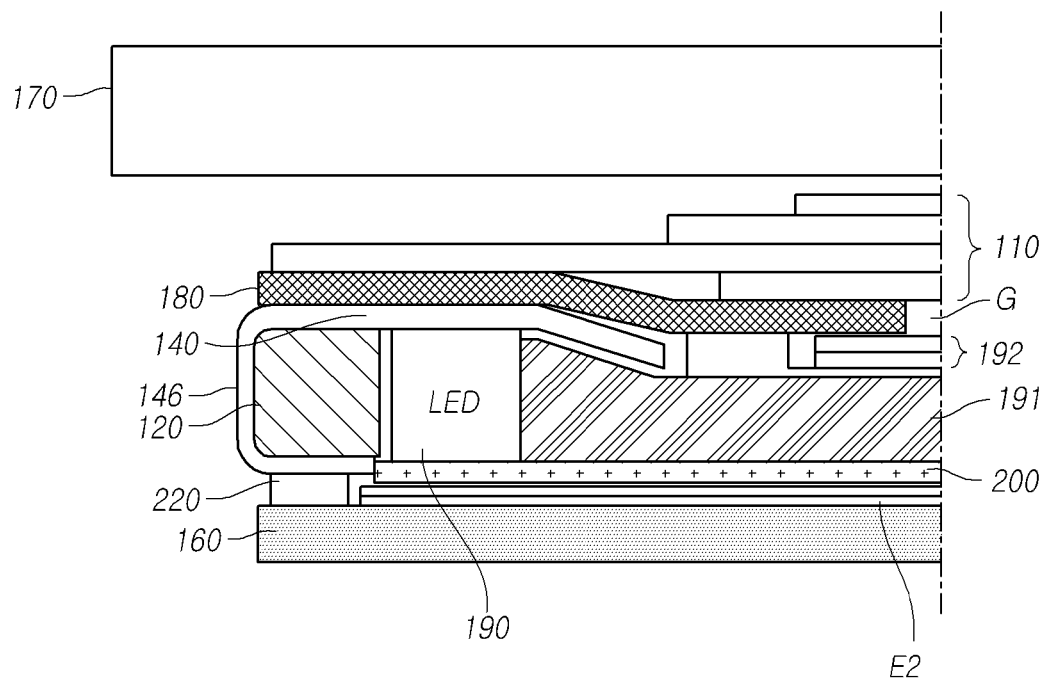

FIGS. 19 and 20 illustrate cross sections of portions, each of which is a region of a light incident portion, and in which signals are transmitted to the second electrode E2 and the ground electrode 160 by the second flexible printed circuit 140 that is formed with folding portions 145 and 146 according to the fourth embodiment of the present invention. FIG. 19 illustrates a structure of a portion to which a second electrode driving signal is transmitted, and FIG. 20 illustrates a structure of a portion to which a ground signal is transmitted.

Referring to FIG. 19, the second flexible printed circuit 140, which may be located below the display panel 110 or the gap pad 180, extends to be folded at a portion where the second electrode driving signal is output, thereby forming a first folding portion 145.

Inside the first folding portion 145, the guide panel 120 located below the second flexible printed circuit 140 is interposed such that the second flexible printed circuit 140 wraps the guide panel 120.

The end portion of the first folding portion 145 comes in contact with, or is electrically connected, via the conductive double-sided tape 220, to the second electrode E2 located below the guide panel 120.

Accordingly, the second electrode driving signal output from the second flexible printed circuit 140 is transmitted to the electrode E2 located below the guide panel 120 through the first folding portion 145 of the second flexible printed circuit 140.

FIG. 20 illustrates a cross section of the display device 100 in the instance where the second folding portion 146 is formed in a portion where a ground signal is output in the second flexible printed circuit 140. In the second flexible printed circuit 140, a portion where the ground signal is output extends to be folded to form a second folding portion 146.

The second folding portion 146 has a structure to wrap the guide panel 120 located below the second flexible printed circuit, and the end portion of the second folding portion 146 comes in contact with, or is electrically connected, via a conductive double-sided tape, to the ground electrode 160 located below the guide panel 120.

Accordingly, the ground signal 160 output from the second flexible printed circuit 140 is transmitted to the ground electrode 160 located below the second electrode E2 through the second folding portion 146 of the second flexible printed circuit 140.

Figure 21:
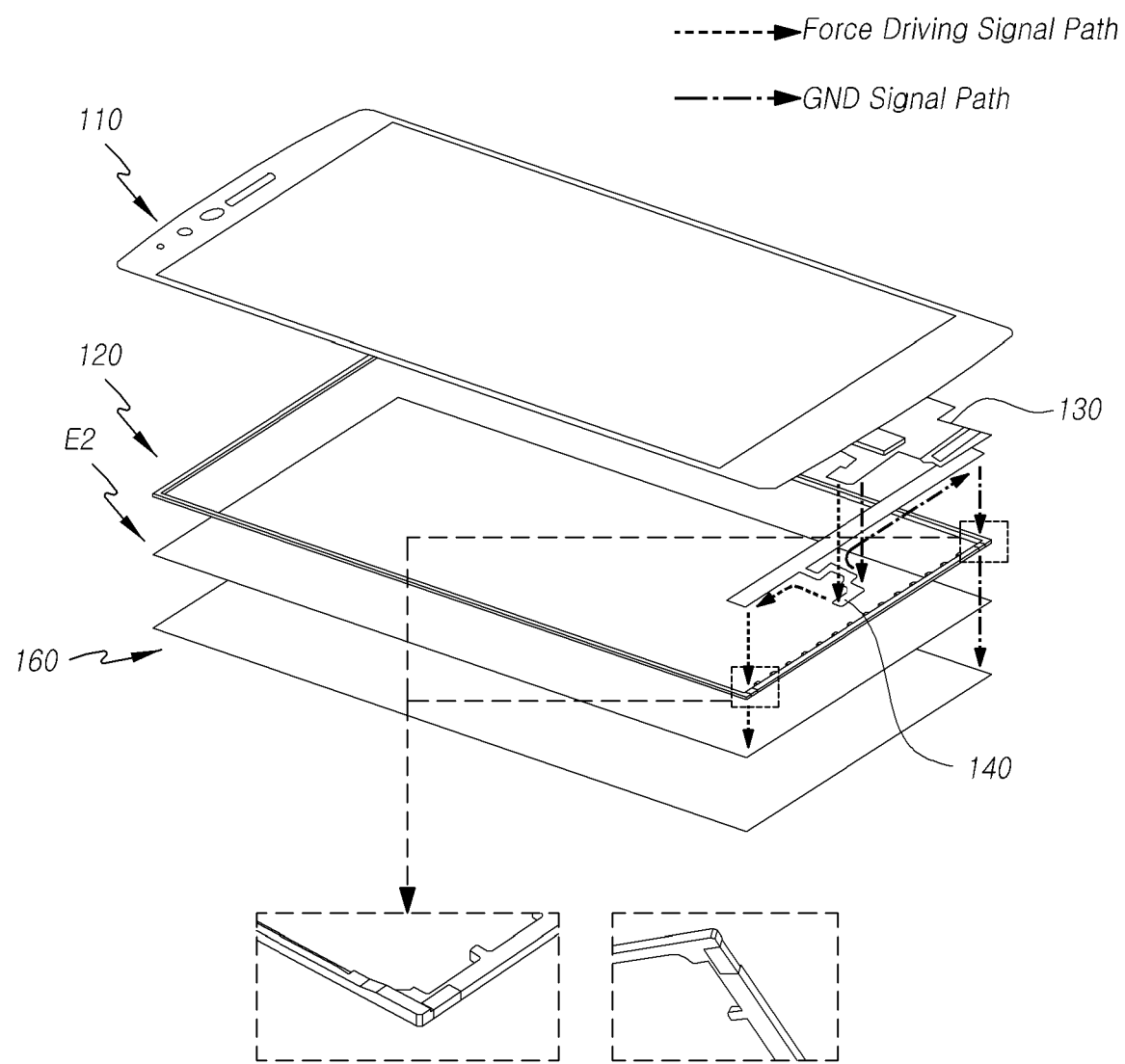
FIG. 21 is a drawing illustrating exemplary overall paths in which a signal is transmitted by a structure of a display device according to the embodiments of the present invention, which are capable of performing touch force sensing.

FIG. 21 illustrates entirely exemplary paths through which a second electrode driving signal and a ground signal are transmitted in the display device 100 having a touch force sensing function according to the embodiments of the present invention. In particular, FIG. 21 illustrates signal transmission paths in the structure according to the third embodiment of the present invention.

Referring to FIG. 21, the display device 100 according to the third embodiment of the present invention includes a display panel 110 having a plurality of first electrodes E1 embedded therein, a first flexible printed circuit 130 electrically connected to the display panel 110, a second flexible printed circuit 140 electrically connected to the first flexible printed circuit 130, a guide panel 120 disposed below the display panel 110 to support the display panel 110, a second electrode E2 located below the guide panel 120 and spaced apart from the plurality of first electrodes E1, and a ground electrode 160 located below the second electrode E2.

A first electrode driving signal output from the touch circuit during a touch driving period of the display panel 110 is sequentially applied to the plurality of first electrodes built in the display panel 110 through the first flexible printed circuit 130.

A second electrode driving signal output from the touch circuit is transmitted to the second flexible printed circuit 140 through the first flexible printed circuit 130, and is transmitted to the first conductive pattern 122 of the guide panel 120 electrically connected to the first pad portion 141 of the second flexible printed circuit 140.

One side of the first conductive pattern 122 of the guide panel 120 is in contact with or is electrically connected, via a conductive double-sided tape, to the first pad portion 141 of the second flexible printed circuit 140, and the other side is in contact with, or is electrically connected, via a conductive double-sided tape, to the second electrode E2 located below the guide panel 120.

Accordingly, the second electrode driving signal is transmitted to the second electrode E2 via the first conductive pattern 122 of the guide panel 120.

The ground signal is transmitted, through the first flexible printed circuit 130 and the second flexible printed circuit 140, to the second conductive pattern 123 of the guide panel 120 electrically connected to the second pad portion 142 of the second flexible printed circuit 140.

One side of the second conductive pattern 123 of the guide panel 120 is in contact with or is electrically connected, via a conductive double-sided tape, to the second pad portion 142 of the second flexible printed circuit 140, and the other side is in contact with or is electrically connected, via a conductive double-sided tape, to the ground electrode 160 located below the second electrode E2.

Accordingly, the ground signal is transmitted to the ground electrode 160 via the second conductive pattern 123 of the guide panel 120.

According to the embodiments of the present invention, by improving the structure of the guide panel 120 or the second flexible printed circuit 140 included in the display device 100, a signal output through the flexible printed circuit can be easily transmitted to the second electrode E2 that is spaced away from the display panel 110 through the structure included in the display device 100, without passing through a separate connection medium.

Further, it is possible to provide a structure in which the ground signal can be easily transmitted to the ground electrode 160 located below the second electrode E2. In addition, it is possible to provide a display device 100 that is capable of performing touch force sensing through the transmission structures of the second electrode driving signal and the ground signal, and has a compact structure.

Although the exemplary embodiments of the present invention have been described for illustrative purposes, those skilled in the art will appreciate that various modifications and substitutions are possible, without departing from the scope and spirit of the invention as disclosed in the accompanying claims. Therefore, the exemplary embodiments disclosed in the present invention are intended to illustrate the scope of the technical idea of the present invention, and the scope of the present invention is not limited by the exemplary embodiments.

What is claimed is:

1. A display device comprising:
a display panel including a plurality of first electrodes embedded therein;
a second electrode disposed to be spaced apart from a rear surface of the display panel;
a guide panel located below the display panel and disposed along a peripheral edge of the display panel; and
a flexible printed circuit interposed between the rear surface of the display panel and a top surface of the guide panel,
wherein the guide panel is located between the display panel and the second electrode,
wherein the guide panel includes a first conductive pattern, the first conductive pattern having first and second sides, the second side being electrically connected to the second electrode,
wherein the second side of the first conductive pattern is disposed between a first side of the second electrode and a pad portion of the first flexible printed circuit,
wherein the second electrode driving signal is transmitted from the first flexible printed circuit to the second electrode through the first conductive pattern,
wherein an inside area of the guide panel except for an area of the guide panel disposed on the peripheral edge of the display panel is opened, and
wherein at least one of a light source, a light guide plate, or an optical sheet is disposed in an inside area of the guide panel in which the guide panel is opened.

2. The display device of claim 1, wherein the first conductive pattern has a "⊏" shape to wrap around a top surface, an outer surface, and a bottom surface of the guide panel, a "¬" shape to wrap around the top surface and the outer surface of the guide panel, or an "L" shape to wrap around the outer surface and the bottom surface of the guide panel.

3. The display device of claim 1, wherein the first side of the first conductive pattern is electrically connected to the pad portion of the first flexible printed circuit.

4. The display device of claim 1, wherein the light guide plate is positioned between the display panel and the second electrode and disposed inside the guide panel,
wherein the optical sheet is disposed on a top surface of the light guide plate, and
wherein a gap exists between a top surface of the optical sheet and the rear surface of the display panel.

5. The display device of claim 4, further comprising:
a reflection plate positioned between a rear surface of the light guide plate and a top surface of the second electrode, and formed of a dielectric material.

6. The display device of claim 1, further comprising:
an insulation layer positioned on a rear surface of the second electrode; and
a ground electrode positioned on a rear surface of the insulation layer and connected to a ground.

7. The display device of claim 6, wherein the guide panel further includes a second conductive pattern electrically connected to the ground electrode.

8. The display device of claim 6, wherein the second electrode includes a flexible copper foil laminated film and a cover layer on the flexible copper foil laminated film, and a portion of the flexible copper foil laminated film is exposed.

9. The display device of claim 1, wherein
the first conductive pattern has a "⊏" shape to wrap around a top surface, an outer surface, and a bottom surface of the guide panel, a "¬" shape to wrap around the top surface and the outer surface of the guide panel, or an "L" shape to wrap around the outer surface and the bottom surface of the guide panel, and
wherein the first conductive pattern is electrically connected to a peripheral signal input medium and the second electrode.

10. The display device of claim 9, wherein the first conductive pattern is positioned at a first side of one edge of the guide panel, and a second conductive pattern is positioned at a second side of the one edge.

11. The display device of claim 9, further comprising a backlight unit, the backlight unit including:
the light source;
the light guide plate, the light guide plate being located adjacent to the light source, and being configured to uniformly transmit light incident from the light source to the display panel; and
the guide panel having a rectangular peripheral shape and accommodating the light source and the light guide plate therein,
wherein the second electrode is located below the light guide plate.

12. The display device of claim 11, wherein second conductive pattern is electrically connected to another electrode located below the second electrode.

13. The display device of claim 1, further comprising a backlight unit, the backlight unit including:
the light source;
the light guide plate, the light guide plate being located adjacent to the light source, and being configured to uniformly transmit light incident from the light source to the display panel; and
the second electrode, wherein the second electrode is located below the light guide plate,
wherein a gap exists between the light guide plate and the second electrode.

14. The display device of claim 13, wherein a reflection plate formed of a dielectric material is positioned between the light guide plate and the second electrode.

15. The display device of claim 14, wherein the gap exists between the reflection plate and the second electrode.

16. The display device of claim 1, wherein the flexible printed circuit includes a first flexible printed circuit and a second flexible printed circuit,
wherein the first flexible printed circuit is configured to transmit, during a touch driving period, a first electrode driving signal to the plurality of first electrodes, and
wherein the second flexible printed circuit is connected to the first flexible printed circuit and is configured to:
receive, from the first flexible printed circuit, a second electrode driving signal for sensing a touch force during the touch driving period, and
transmit the second electrode driving signal to the second electrode.

17. A display device comprising:
a display panel including a plurality of first electrodes embedded therein;
a guide panel located below the display panel and disposed along a peripheral edge of the display panel;
a second electrode disposed to be spaced apart from a rear surface of the display panel;
a first flexible printed circuit electrically connected to the display panel; and
a second flexible printed circuit electrically connected to the first flexible printed circuit,
wherein the guide panel is located between the display panel and the second electrode,
wherein the second flexible printed circuit includes a first folding portion folded to a side surface of the guide panel and having an end portion electrically connected to the second electrode,
wherein the guide panel is disposed between the second flexible printed circuit and the second electrode, and the end portion of the first folding portion is disposed under the guide panel and in an opposite direction to the display panel,
wherein the second electrode driving signal is transmitted from the second flexible printed circuit to the second electrode through the first folding portion,
wherein an inside area of the guide panel except for an area of the guide panel disposed on the peripheral edge of the display panel is opened, and
wherein at least one of a light source, a light guide plate, or an optical sheet is disposed in an inside area of the guide panel in which the guide panel is opened.

18. The display device of claim 17, further comprising:
an insulation layer positioned on a rear surface of the second electrode; and
a ground electrode positioned on a rear surface of the insulation layer and connected to a ground,
wherein the second flexible printed circuit includes a second folding portion folded to the side surface of the guide panel and electrically connected to the ground electrode.

19. The display device of claim 17, wherein the second flexible printed circuit further includes:
a main circuit portion;
a protrusion protruding from one point of the main circuit portion and having a signal input terminal at one end thereof;
the first folding portion extending from another point of the main circuit portion to be folded; and
a signal wiring electrically connecting the signal input terminal and the end portion of the first folding portion.

20. The display device of claim 19, wherein the first folding portion extends from a first side of the main circuit portion and a second folding portion extending from a second side of the main circuit portion.

21. The display device of claim 20, wherein the first folding portion includes an end portion electrically connected to any one electrode and the second folding portion includes an end portion electrically connected to another electrode.

22. The display device of claim 17, wherein the first flexible printed circuit is configured to transmit, during a touch driving period, a first electrode driving signal to the plurality of first electrodes, and
wherein the second flexible printed circuit is configured to:
receive, from the first flexible printed circuit, a second electrode driving signal for sensing a touch force during the touch driving period, and
transmit the second electrode driving signal to the second electrode.

* * * * *